United States Patent [19]

Coulbourn

[11] Patent Number: 5,253,221
[45] Date of Patent: Oct. 12, 1993

[54] NULL STEERING DEVICE

[75] Inventor: Dixon W. Coulbourn, Austin, Tex.

[73] Assignee: The United States of America as represented by the Secretary of the Navy, Washington, D.C.

[21] Appl. No.: 808,845

[22] Filed: Jun. 17, 1977

[51] Int. Cl.$^5$ .................. H04B 1/06; F42B 19/00
[52] U.S. Cl. ...................... 367/135; 367/121; 114/20.1
[58] Field of Search ............ 114/21 A, 20.1; 343/18 E; 340/6, 50; 367/118-121, 135

[56] References Cited

U.S. PATENT DOCUMENTS

| 2,464,258 | 3/1949 | Prichard | 343/18 E |
| 2,524,180 | 10/1950 | Schuck | 114/21 A |
| 2,666,192 | 1/1954 | Hunt et al. | 114/21 A |
| 4,017,867 | 4/1977 | Claus | 340/6 |
| 4,025,894 | 5/1977 | Ziese | 340/6 |

Primary Examiner—Ian J. Lobo
Attorney, Agent, or Firm—William C. Townsend; Edward J. Connors, Jr.

[57] ABSTRACT

A device for steering a null in a sonar beam pattern resolves first and second beam signals into four quadrature components. These components are multiplied in multiplying digital to analog converters by binary number factors, derived in accordance with the desired null angle, to provide analog signals that are combined in a summing amplifier to provide analog output corresponding to acoustic energy received by a beam having a null at the desired angle.

8 Claims, 1 Drawing Sheet

NULL STEERING DEVICE

FIELD OF THE INVENTION

This invention relates generally to directional sonar systems such as are used in acoustic homing torpedoes, and more particularly to the generation of a digitally steerable null in a sonar system beam pattern for the purpose of rendering the system relatively insensitive to a strong source of interfering noise.

DISCUSSION OF THE PRIOR ART

Acoustic torpedoes have generally comprised a guidance system including a receiving transducer that is characterized by a directional beam pattern and a receiver that is responsive to target echo signals to modulate the positions of the torpedo steering surfaces as necessary to continuously direct the torpedo toward the target, although the target may execute evasive maneuvers. A strong source of interfering noise, such as can be generated by a countermeasure device deployed by the target, can render a torpedo homing system insensitive to target echoes by causing the AGC (automatic gain control) of the receiver to drive the receiver gain to its lower limit. The dynamic range of the system is then not likely to be great enough to detect a target echo signal that is much smaller in amplitude than the noise source.

It has been recognized that if the noise emanates from a source of modest size, and hence arrives at the receiver over a very small solid angle, then the interference can be suppressed by creating a notch or null in the transducer beam pattern and steering the null so as to point at the noise source. The amount of suppression depends upon the accuracy of the null steering and the frequency bandwidth.

Steering of the null has been proposed to be accomplished, in the case of a beam pattern having a fixed null therein, by steering the torpedo body so that the null points in the direction of the countermeasure noise source. This, however, imposes a constraint on optimizing the pattern gain in the direction of the true target. In addition, the body dynamics of the torpedo prevent rapid training of the null for the purpose of searching for the countermeasure initially, and for tracking the interference as the geometry of the situation changes. It has also been proposed that nulls may be steered within the beam pattern of an antenna array by electronic means including a combination of phase shifters, signal dividers, and summers. Such an approach is described in an article entitled "Independent Angular Steering of Each Zero of the Directional Pattern for a Linear Array," IEEE Transactions on Antennas and Propagation, Vol. AP 15, pp. 296-298 (March 1967). The concept there described, however, falls short of a null steering system that can readily be included in a torpedo guidance system, and is subject to losses of received energy, due to the requirement of load arms.

SUMMARY OF THE INVENTION

With the foregoing in mind, it is a primary object of the present invention to overcome most or all of the disadvantages or shortcomings of the prior art through the provision of an improved device for steering a null in the receiving transducer pattern of an acoustic system.

Another object of the invention is to provide for improved receiver pattern null steering for reducing the effects of countermeasure devices on an acoustic torpedo.

Still another important object of the invention is to provide a digitally steerable receiver pattern null forming network.

As another object the invention aims to provide a null steering network of the foregoing character, which is reliable, requires low power input, is compact and inexpensive to manufacture as compared to complex mechanical systems.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
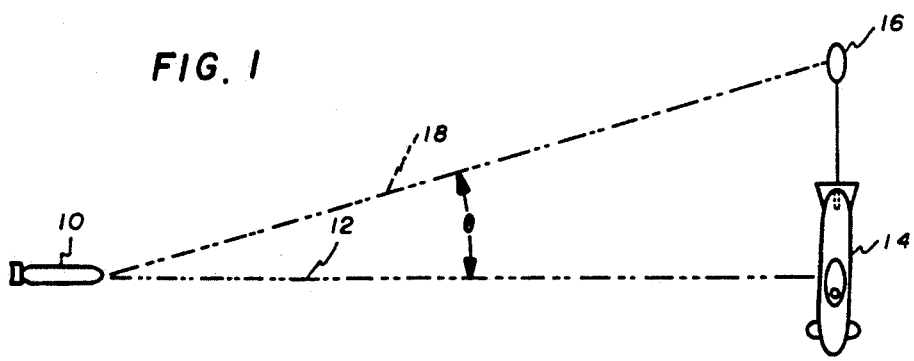
FIG. 1 is a plan view illustrating positional relationships of an acoustic torpedo utilizing the invention, a submarine target, and a countermeasure device.

Referring first to FIG. 1, consider an acoustic homing torpedo 10 as having aligned itself along an axis 12 intersecting a submarine target 14. The torpedo 10 comprises a sonar system that serves to cause the torpedo to be steered so as to maintain a collision course with the target 14. Target 14 is towing an acoustic torpedo countermeasure device 16 that is a strong source of interfering noise for the purpose of rendering the torpedo homing system sonar insensitive to the target echo signals. The noise from the countermeasure device 16 arrives at the receiving transducer array of torpedo 10 along a path or axis 18 that differs from the centerline axis 12 of the torpedo by an angle $\theta$.

Figure 2:
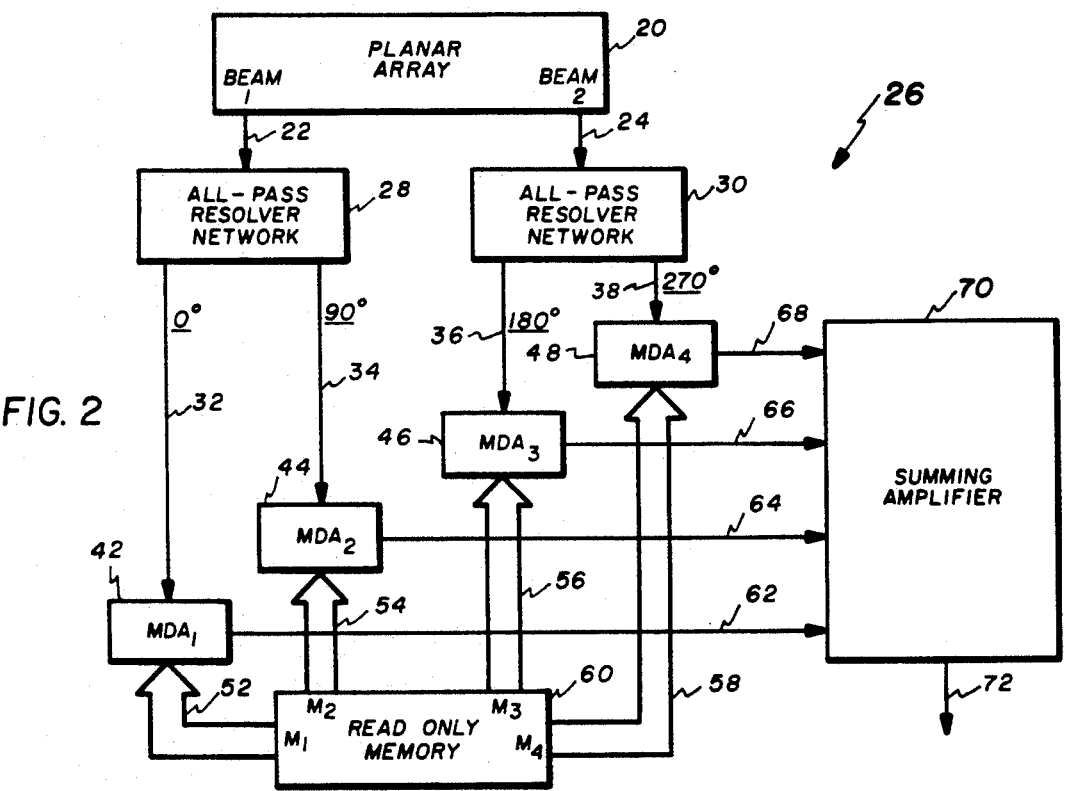
FIG. 2 is a diagrammatic illustration, in block form, of a null steering device in accordance with the invention.

Referring now to FIG. 2, the torpedo 10 comprises a planar receiving array 20, of sound pressure sensors. Using well known beamforming techniques, the outputs of the elements of the array are phased and combined so that the array provides first and second electrical outputs 22 and 24 in the form of analog voltage signals, corresponding to the return from two very similar beams with the phase centers of the beams separated in the array plane, for example by $\frac{1}{2}$ to $1\frac{1}{2}$ wavelengths at the center of the operating frequency band. In accordance with the invention, these beams are combined to form a beam having a steerable notch or null which can be directed along the axis 18 from which the interfering noise arrives.

To this end, a null steering device, embodying the invention and generally indicated at 26, comprises a pair of all-pass resolver networks 28, 30 which serve to separate each of the incoming first and second beam signals 22, 24 into two components that are 90° out of phase. In addition, one of the resolver networks, e.g., 30, shifts phase of both of the components by 180°. Thus, network 28 provides parallel quadrature signals represented by lines 32 and 34 and having phase relationships of 0° and 90° with respect to the signal input 22. Network 30 provides parallel quadrature signals represented by lines 36 and 38 and having phase relationships of 180° and 270° with respect to the signal input 24.

The signals 32, 34, 36, and 38 are applied as inputs to four MDA's (multiplying digital to analog converters) 42, 44, 46, and 48, respectively. Of these four input signals to the MDA's, signals 32 and 34 contain analog data corresponding to acoustic energy received by beam 1, whereas signals 36 and 38 contain analog data corresponding to acoustic energy received by beam 2.

The data inputs of signals 32, 34, 36, and 38 are multiplied in the MDA's 42, 44, 46, and 48 by multiplying factor inputs in the form of binary numbers $M_1$, $M_2$, $M_3$, and $M_4$, represented by the broad flow lines 52, 54, 56, and 58, respectively. The numbers $M_1$, $M_2$, $M_3$, and $M_4$ are provided, in this example, by a read only memory 60. The read only memory 60 stores the multiplier factors necessary for steering a null in a composite beam in a selected direction characterized by the angle $\theta$. While it is not necessary to the invention per se, it will be appreciated that a computer may control the addressing of the readout of the memory 60 as necessary to change the steering of the null as the angle $\theta$ changes with the problem geometry during an attack, thereby causing the null to track on the interference while the torpedo tracks on the target.

The products of the multiplications in the MDA's 42, 44, 46, and 48 are modified analog signals represented by flow lines 62, 64, 66, and 68, respectively, that are applied as parallel inputs to a summing amplifier 70. These product signal analog inputs to the summing amplifier 70 are combined therein to provide an analog output signal 72 that contains a sharply reduced amount of acoustic energy data from the direction of angle $\theta$, while otherwise containing substantially the acoustic data that would be derived from a single directional beam having its principal axis coincident with axis 12. Thus, the output signal 72 can be processed by the sonar receiver in the usual manner for target detection and steering of the torpedo 10, without the disabling loss of sensitivity that would be imposed by the countermeasure 16 in the absence of the invention.

Assuming a signal $A \sin(\omega t + \gamma_{65})$ at the output of beam 2, the sum output, $\Sigma$ may be expressed, $$\Sigma = AM_1 \sin\left(\omega t + \frac{2\pi d}{\lambda}\sin\theta + \phi(f) + \gamma\right) +$$

$$AM_2 \cos\left(\omega t + \frac{2\pi d}{\lambda}\sin\theta + \phi(f) + \lambda\right) -$$

$$AM_3 \sin(\omega t + \phi(f) + \gamma) - AM_4 \cos(\omega t + \phi(f) + \gamma),$$

where
A is the amplitude of the received sinusoid,
$M_i$ is the multiplying factor used in the ith MDA, i=1, 2, 3, or 4
$\omega$ is the radian frequency of the received sinusoid ($\omega = 2\pi f$),
$\gamma$ is the fixed part of the phase of the received sinusoid,
$\phi(f)$ is an angle which is a function of the frequency f, and is a property of the all-pass network,
$\theta$ is the angle from the array normal to the source of the received sinusoid and is the angle desired to null in this analysis,
d is the separation of phase centers of beams 1 and 2,
$\lambda$ is the wavelength of the received sinusoid; $\lambda = c/f$, in which c is the speed of sound in water,
$\lambda_o$ is the wavelength at the center frequency of the operating band.

Let $M_1 = \sin\left(\frac{2\pi d}{\lambda_o}\sin\theta\right)$, $M_2 = \cos\left(\frac{2\pi d}{\lambda_o}\sin\theta\right)$, $M_3 = 0$,
$M_4 = 1$.

Then $$\Sigma = A\sin\left(\frac{2\pi d}{\lambda_o}\sin\theta\right)\sin\left(\omega t + \frac{2\pi d}{\lambda}\sin\theta + \phi(f) + \gamma\right) +$$

$$A\cos\left(\frac{2\pi d}{\lambda_o}\sin\theta\right)\cos\left(\omega t + \frac{2\pi d}{\lambda}\sin\theta + \phi(f) + \gamma\right) -$$

$$A\cos(\omega t + \theta(f) + \gamma)$$

$$\Sigma = A\cos\left(\left(\frac{1}{\lambda} - \frac{1}{\lambda_o}\right)2\pi d \sin\theta + \omega t + \phi(f) + \gamma\right) -$$

$$A\cos(\omega t + \phi(f) + \gamma.$$

Figure 3:
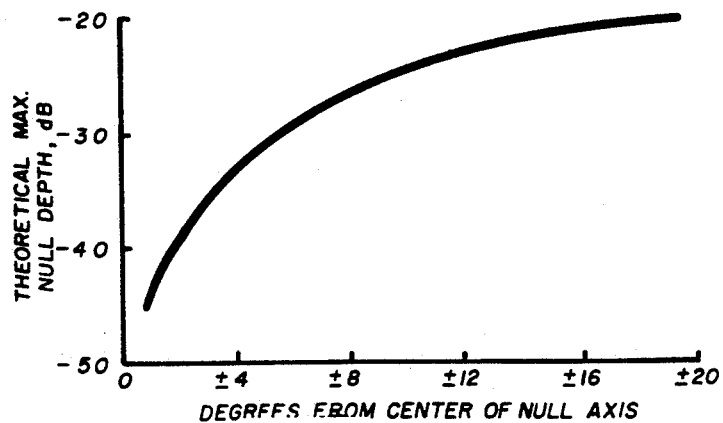
FIG. 3 is a graphic illustration of the theoretical maximum null depths achieved through the use of the invention.

The term $$\left(\frac{1}{\lambda} - \frac{1}{\lambda_o}\right)2\pi d \sin\theta$$

approaches zero as $\theta \to 0$ or as $\lambda \to \lambda_o$, and the result is approximately $$\Sigma = A\left(\frac{1}{\lambda} - \frac{1}{\lambda_o}\right)2\pi d \sin\theta \sin(\omega t + \phi(f) + \gamma),$$

which is small for narrow band signals or for small $\theta$. For example, if $$d = \frac{3\lambda}{2}$$

at center frequency, and the filter bandwidth is 7.44% of center frequency, then the null depth for a tone at the band edge may be taken from curve 76 of FIG. 3. Null depth for noise across the band would be greater.

In an actual experimental embodiment of the invention, MDA 46 was programmed to multiply by zero, and MDA 48 was programmed to multiply by one. In such a case, MDA 46 can be removed from the device and replaced with an appropriate load on the corresponding output 36 of the network 30. Furthermore, MDA 48 could be replaced by a network which would present the proper load to the output 38 of the network 30 as well as connecting that network to the corresponding input of the summing amplifier 70 with the same level as would be produced by the MDA 48 when employed as earlier described.

Moreover, the read only memory, and associated computer if used, could be replaced by a computer that actively generates the multiplying factors.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. In combination with a sonar system including a receiving transducer array providing first and second analog signals representative of acoustic energy reception of a beam pattern having a receiving null therein, a null steering device for causing said null to be positioned at a predetermined null angle relative to the principal axis of said array, said device comprising:
   resolver means, connected to said array, for resolving said first and second analog signals into quadrature component signals;
   a source of null angle determining amplitude multiplier factor signals;
   multiplier means, connected to said resolver means and to said source, for providing a plurality of amplitude product signals representative of products of said quadrature component signals and said amplitude multiplier factor signals; and
   summing means, for summing said plurality of amplitude product signals to provide an analog output signal representative of acoustic energy received by said beam pattern with said null at said predetermined null angle.

2. A null steering device as defined in claim 1, and wherein said resolver means comprises:
   a first all pass network responsive to said first analog signal to provide first and second quadrature component signals characterized by a 90° phase difference between one another; and
   a second all pass network responsive to said second analog signal to provide third and fourth quadrature component signals characterized by a 90° phase difference between one another and 180° phase differences relative to said first and second quadrature component signals, respectively.

3. A null steering device as defined in claim 1, and wherein said source of amplitude multiplier factor signals comprises a digital device and said amplitude multiplier factor signals are binary in form.

4. A null steering device as defined in claim 2, and wherein said source of amplitude multiplier factor signals comprises a digital device and said amplitude multiplier factor signals are binary in form.

5. A null steering device as defined in claim 4, and wherein said multiplier means comprises:
   a plurality of multiplying digital to analog converters, each of said converters being responsive to one of said quadrature component signals and a respective one of said multiplying factor signals to provide one of said amplitude product signals, said amplitude product signals being in analog form.

6. A null steering device as defined in claim 5, and wherein said source of multiplying factor signals comprises read only memory means.

7. In combination with an acoustic torpedo, including a planar array of acoustic receiving transducers providing first and second analog signals representative of reception of acoustic energy having wavelength $\lambda$ by two substantially identical beams separated in the array plane by a predetermined distance d, a null steering device for providing an analog output signal representative of acoustic energy reception by a beam pattern having a receiving null positioned at a predetermined null angle $\theta$ relative to a principal axis of said beam, said null steering device comprising:
   a first all pass resolver network responsive to said first analog signal to provide first and second quadrature component signals;
   a second all pass resolver network responsive to said second analog signal to provide third and fourth quadrature component signals having 1800 phase differences with respect to said first and second quadrature component signals, respectively;
   digital means for providing a set of amplitude multiplying factors in the form of binary numbers;
   a plurality of multiplying digital to analog converters, each connected to receive a predetermined one of said quadrature component signals and a corresponding one of said multiplying factors and to provide a corresponding amplitude product signal in analog form;
   a summing amplifier operative to combine said amplitude product signals to provide said analog output signal.

8. A null steering device as defined in claim 7, and wherein said plurality of multiplying digital converters comprises first, second, third, and fourth multiplying digital to analog converters connected to multiply said first, second, third, and fourth quadrature component signals by first, second, third, and fourth of said multiplying factors so as to provide first, second third, and fourth analog amplitude product signals, respectively, to said summing amplifier.

* * * * *